UNITED STATES PATENT OFFICE.

ALVAH W. ESTABROOK AND HARRY E. WEAVER, OF KANSAS CITY, MISSOURI, ASSIGNORS TO THE LARABEE FLOUR MILLS COMPANY, OF HUTCHINSON, KANSAS, A CORPORATION OF KANSAS.

DRY-SHORTENING FLOUR.

1,119,260.  Specification of Letters Patent.  Patented Dec. 1, 1914.

No Drawing.   Application filed November 6, 1913.   Serial No. 799,509.

*To all whom it may concern:*

Be it known that we, ALVAH W. ESTABROOK and HARRY E. WEAVER, citizens of the United States, residing in Kansas City, in the county of Jackson and State of Missouri, have invented new and useful Improvements in Dry-Shortening Flour, of which the following is a specification.

Our invention relates to a dry shortening flour, in which a finely comminuted salt of a fatty acid is mixed with flour in the dry state so that when the flour is made into a dough by the addition of water, milk, or the like, and baked, the said salt will be softened or melted, and will be in a condition to exert a shortening action on the product. The salt of a fatty acid which we prefer to employ is sodium stearate. This salt is relatively hard and can be powdered or comminuted with comparative ease and mixed with flour, and under ordinary conditions may be kept for an indefinite length of time without becoming soft and greasy. The sodium stearate, when mixed with flour in a dry state, will remain chemically and physically separate therefrom; that is to say, it will not modify, or itself be modified by, the flour, and the flour, moreover, will not be rendered greasy by its presence. As to proportions, we have found, for making ordinary biscuits, or pie crust, that from ten to twelve pounds of sodium stearate should be mixed with two hundred pounds of flour. The amount of the stearate, however may be varied within reasonable limits, as will be understood, according to the degree of shortening which it is desired to obtain. Sodium stearate can be readily obtained in a practically pure state, and when ground or powdered and mixed with flour the product can be barreled or sacked for commercial use, and kept for an indefinite period of time without materially deteriorating. In addition to the sodium stearate, we may also add to the flour any suitable baking powder, or salts capable of reacting when moistened and subjected to heat, to liberate carbonic acid gas, and, if desired, suitable seasoning may also be added. To use the flour to make biscuits, or a similar shortened product, such as pie crust, it is only necessary to make a dough of the flour by adding milk or water, and then subjecting the dough to baking.

By our invention we are enabled to produce a dry, or self-shortening, flour, in an economical manner, one that is free from any undesirable attributes, either as to keeping quality or flavor, and which, when made into a dough and baked, will produce a shortened product comparable to one which has been made by adding to the flour lard, butter, or other fat, as is now customary.

We claim:

1. A dry shortening flour containing a shortening amount of a comminuted edible alkali salt of a fatty acid.

2. A dry shortening flour containing comminuted sodium stearate.

3. The herein described product, comprising flour having mixed therewith in the dry state a shortening amount of a powdered edible alkali salt of a fatty acid, and gas producing materials.

4. The herein described product, comprising flour having mixed therewith in the dry state powdered sodium stearate, and gas producing materials.

In testimony whereof, we have hereunto set our hands in presence of two subscribing witnesses.

ALVAH W. ESTABROOK.
HARRY E. WEAVER.

Witnesses:
L. G. BIGGS,
R. C. JACKMAN.